United States Patent [19]

Kurano

[11] Patent Number: 5,323,399

[45] Date of Patent: Jun. 21, 1994

[54] ATM CELL MULTIPLEXING DEVICE CAPABLE OF REDUCING AN ACCESSING SPEED TO A FIFO MEMORY THEREOF

[75] Inventor: Takatoshi Kurano, Tokyo, Japan

[73] Assignee: NEC Corporation, Tokyo, Japan

[21] Appl. No.: 859,009

[22] Filed: Mar. 30, 1992

[30] Foreign Application Priority Data

Mar. 29, 1991 [JP] Japan .................................. 3-089305

[51] Int. Cl.$^5$ .............................................. H04J 3/04
[52] U.S. Cl. .................... 370/112; 370/58.1
[58] Field of Search ...................... 370/112, 58.1, 58.2, 370/58.3, 94.1, 60, 80, 62

[56] References Cited

U.S. PATENT DOCUMENTS

| 5,067,123 | 11/1991 | Hyodo et al. ........................ 370/58.1 |
| 5,086,424 | 2/1992 | Motohashi et al. .................. 370/112 |
| 5,121,385 | 6/1992 | Tominaga et al. ................... 370/112 |

OTHER PUBLICATIONS

Suzuki et al., "Output-buffer switch architecture for asynchronous transfer mode", IEEE International Conference on Communications, CHZ 655-9 (1989), pp. 0099-0103.

Primary Examiner—Douglas W. Olms
Assistant Examiner—Dang Ton
Attorney, Agent, or Firm—Foley & Lardner

[57] ABSTRACT

On time division multiplexing first through N-th input signals, each having a bit rate V to represent successive ATM cells, a multiplexing section (12, 13') multiplexes the first through the N-th input signals and a dummy input signal into a time division multiplexed signal having another bit rate $V \times (N+1)$ and comprising first through N-th multiplexed cells and a dummy multiplexed cell. The first through the N-th and the dummy multiplexed cells are derived from the first through the N-th and the dummy input signals, respectively. A controller (16') successively writes valid cells of the first through the N-th multiplexed cells in an FIFO memory (15) as written cells at a writing rate equal to the bit rate $V \times (N+1)$ for a writing time interval defined by the first through the N-th multiplexed cells and reads the written cells from the FIFO memory in a first-in first-out order as a read-out signal at a reading rate equal to the bit rate $V \times (N+1)$ for a reading time interval defined by the dummy multiplexed cell. A converter (17) converts the read-out signal into a multiplexed output signal having the bit rate V.

2 Claims, 8 Drawing Sheets

PRIOR ART

ATM CELL MULTIPLEXING DEVICE CAPABLE OF REDUCING AN ACCESSING SPEED TO A FIFO MEMORY THEREOF

BACKGROUND OF THE INVENTION

This invention relates to an ATM (asynchronous transfer mode) cell multiplexing device for multiplexing ATM cells.

An ATM cell multiplexing device of the type described, generally comprises first through N-th input lines supplied with first through N-th input signals, each having a predetermined bit rate V to represent successive ATM cells classifiable into valid and invalid cells, where N represents an integer greater than one. The invalid cells will be called empty or idle cells in the art. The ATM cell multiplexing device further comprises at least one output line and a processing section connected to the first through the N-th input lines and to the output line. The processing section processes the first through the N-th input signals into a time division multiplexed output signal having the predetermined bit rate V. The processing section delivers the time division multiplexed output signal to the output line. Such an ATM cell multiplexing device is described in a paper contributed by Hiroshi SUZUKI et al to IEEE International Conference on Communications, CH2655-9 (1989), pages 0099–0103, under the title of "Output-buffer Switch Architecture for Asynchronous Transfer Mode".

As will later be described in connection with a conventional ATM cell multiplexing device, the processing section comprises a time division multiplexing section connected to the first through the N-th input lines for time division multiplexing the first through the N-th input signals into a time division multiplexed signal having a preselected bit rate $V \times N$ and comprising first through N-th multiplexed cell or components. The first through the N-th multiplexed cells are derived from the first through the N-th input signals, respectively.

A first-in first-out (FIFO) memory is connected to the time division multiplexing section. A controller is connected to the time division multiplexing section and to the first-in first-out memory for controlling the first-in first-out memory to successively write the valid cells of the first through the N-th multiplexed cells in the first-in first-out memory as written cells at a writing rate or speed equal to $2 \times V \times N$ and to read the written cells out of the first-in first-out memory in a first-in first-out order as a read-out signal at a reading rate or speed equal to $2 \times V \times N$. Inasmuch as the writing operation is not carried out simultaneously with the reading operation for the first-in first-out memory using a single port RAM, each of the writing and the reading rates is inevitably made to become equal to twice the preselected bit rate $V \times N$ to carry out the reading and the writing operation in a time division fashion.

A converter is connected to the first-in first-out memory and to the output line. The converter converts the read-out signal into the time division multiplexed output signal of the predetermined bit rate V to deliver the time division multiplexed output signal to the output line.

In order to realize the ATM cell multiplexing device having a large scale and a high speed, it is required to reduce an accessing speed (namely, the writing and the reading rates or speeds) to the first-in first-out memory.

SUMMARY OF THE INVENTION

It is therefore an object of this invention to provide an ATM cell multiplexing device which is capable of reducing an accessing speed to a first-in first-out memory.

Other objects of this invention will become clear as the description proceeds.

On describing the gist of this invention, it is possible to understand that an ATM cell multiplexing device comprises: first through N-th input lines supplied with first through N-th input signals, each having a predetermined bit rate V to represent successive ATM cells classifiable into valid and invalid cells, where N represents an integer greater than one; an output line; and processing means connected to the first through the N-th input lines and to the output line for processing the first through the N-th input signals into a time division multiplexed output signal having the predetermined bit rate V. The processing means is for delivering the time division multiplexed output signal to the output line.

According to this invention, the processing means comprises in the above-understood ATM cell multiplexing device: an additional input line supplied with an additional input signal having the predetermined bit rate V representation successive cells which are identical to the invalid cells; time division multiplexing means connected to the first through the N-th input lines and the additional input line for time division multiplexing the first through the N-th input signals and the additional input signal into a time division multiplexed signal having a prescribed bit rate $V \times (N+1)$ and comprising first through N-th multiplexed cells and an additional multiplexed cell, the first through the N-th multiplexed cells and the additional multiplexed cell being derived from the first through the N-th input signals and the additional input signal, respectively; a first-in first-out memory connected to the time division multiplexing means; controlling means connected to the time division multiplexing means and to the first-in first-out memory for controlling the first-in first-out memory to successively write the valid cells of the first through the N-th multiplexed cells in the first-in first-out memory as written cells at a writing rate equal to the prescribed bit rate $V \times (N+1)$ for a writing time interval defined by the first through the N-th multiplexed cells and to read the written cells out of the first-in first-out memory in a first-in first-out order as a read-out signal at a reading rate equal to the prescribed bit rate $V \times (N+1)$ for a reading time interval defined by the additional multiplexed cell; and converting means connected to the first-in first-out memory and to the output line for converting the read-out signal into the time division multiplexed output signal to deliver the time division multiplexed output signal to the output line.

In another embodiment of the invention there is provided an ATM cell multiplexing device which includes first through N-th output lines having different output line numbers where M represents a natural number greater than 1; first through N-th input lines supplied with first through N-th input signals with each of the signals having a predetermined bit rate V and representing successive ATM cells classifiable into valid cells and invalid cells. Each of the valid cells have a destination address representative of one of the input line numbers where N represents an integer greater than 1. An additional input line is supplied with an additional input signal which has a predetermined bit rate V and which represents successive additional cells each of which are identical to the invalid cells. Also provided is a time division multiplexing means which is connected to the first through the N-th input lines and the additional input line for time division multiplexing the first through the N-th input signals and the additional input signal into a time division multiplex signal. The time division multiplex signal has a prescribed bit rate $V \times (N+1)$ and comprises first through the N-th multiplex cells and an additional multiplex cell. The first through the N-th multiplex cells and the additional multiplex cells are derived from the first through the N-th input signals and the additional input signal, respectively. Additionally, first-in/first-out memories are provided which correspond to the first through the N-th output lines and are connected to the time division multiplexing means. A controlling means is provided which is connected to the time division multiplexing means and the first through N-th first-in/first-out memories to control the first through the N-th first-in/first-out memory so as to successively write the valid cells of the first through the N-th multiplex cells in corresponding ones of the first-in/first-out memories as written cells. The writing rate is equal to the prescribed bit rate $V \times (N+1)$ and the reading rate is equal to the prescribed bit rate $V \times (N+1)$. Finally, first through N-th converting means are connected to the first through the N-th first-in/first-out memories and to the first through the N-th output lines for converting the first through the N-th read-out signals into first through the N-th time division multiplexed output signals.

DESCRIPTION OF THE PREFERRED EMBODIMENTS

Figure 1:
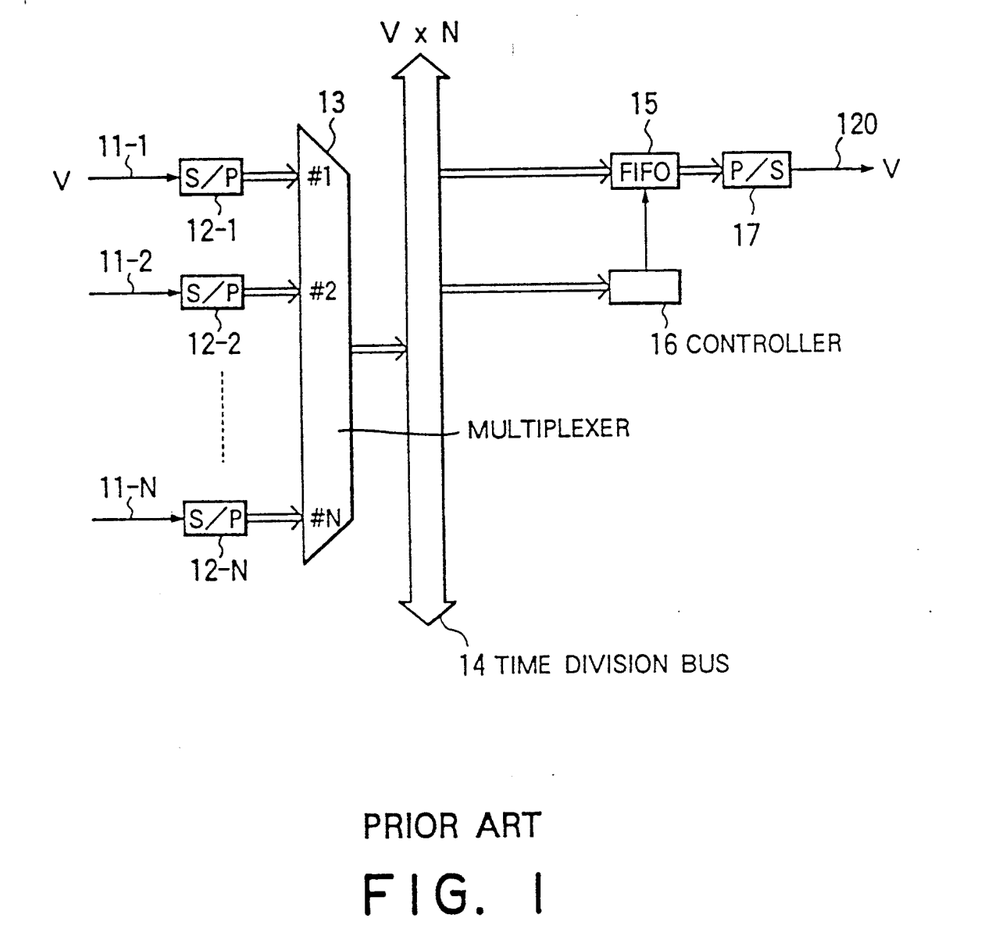
FIG. 1 is a block diagram of a conventional ATM cell multiplexing device.

Referring to FIG. 1, a conventional ATM cell multiplexing device will first be described for a better understanding of this invention. The ATM cell multiplexing device is equivalent to the conventional ATM cell multiplexing device described in the preamble of the instant specification. The ATM cell multiplexing device comprises first through N-th input lines 11-1, 11-2, ..., and 11-N supplied with first through N-th input signals, where N represents an integer greater than one. Each of the first through the N-th input signals has a predetermined bit rate V of, for example, 622.08 Mbits/s to represent successive ATM cells classifiable into valid and invalid or empty cells. The ATM cell multiplexing device further comprises an output line 120.

First through N-th serial-parallel (S/P) converters 12-1, 12-2, and 12-N are connected to the first through the N-th input lines 11 (suffixes omitted). The first through the N-th serial-parallel converters 12 (suffixes omitted) convert the first through the N-th input signals to first through N-th parallel signals, each having a bit rate of, for example, 11.52 Mbits/s in order to reduce a processing speed of a multiplexer 13.

The multiplexer 13 is connected to the first through the N-th serial-parallel converters 12 for time division multiplexing the first through the N-th parallel signals into a time division multiplexed signal having a preselected bit rate $V \times N$ and comprising first through N-th multiplexed cells or components. The first through the N-th multiplexed cells are derived from the first through the N-th input signals, respectively. Supposing that the integer N is equal to eight, the preselected bit rate $V \times N$ is equal to 4976.64 Mbits/s.

A first-in first-out (FIFO) memory 15 using a single port RAM is connected to the multiplexer 13 through a time division bus 14 used for the preselected bit rate $V \times N$. A controller 16 is connected to the time division bus 14 and to the first-in first-out memory 15 for controlling the first-in first-out memory 15 to successively write the valid cells of the first through the N-th multiplexed cells in the first-in first-out memory 15 as written cells at a writing rate or speed equal to $2 \times V \times N$ and to read the written cells out of the first-in first-out memory 15 in a first-in first-out order as a read-out signal at a reading rate or speed equal to $2 \times V \times N$ as shown in FIG. 2.

Figure 2:
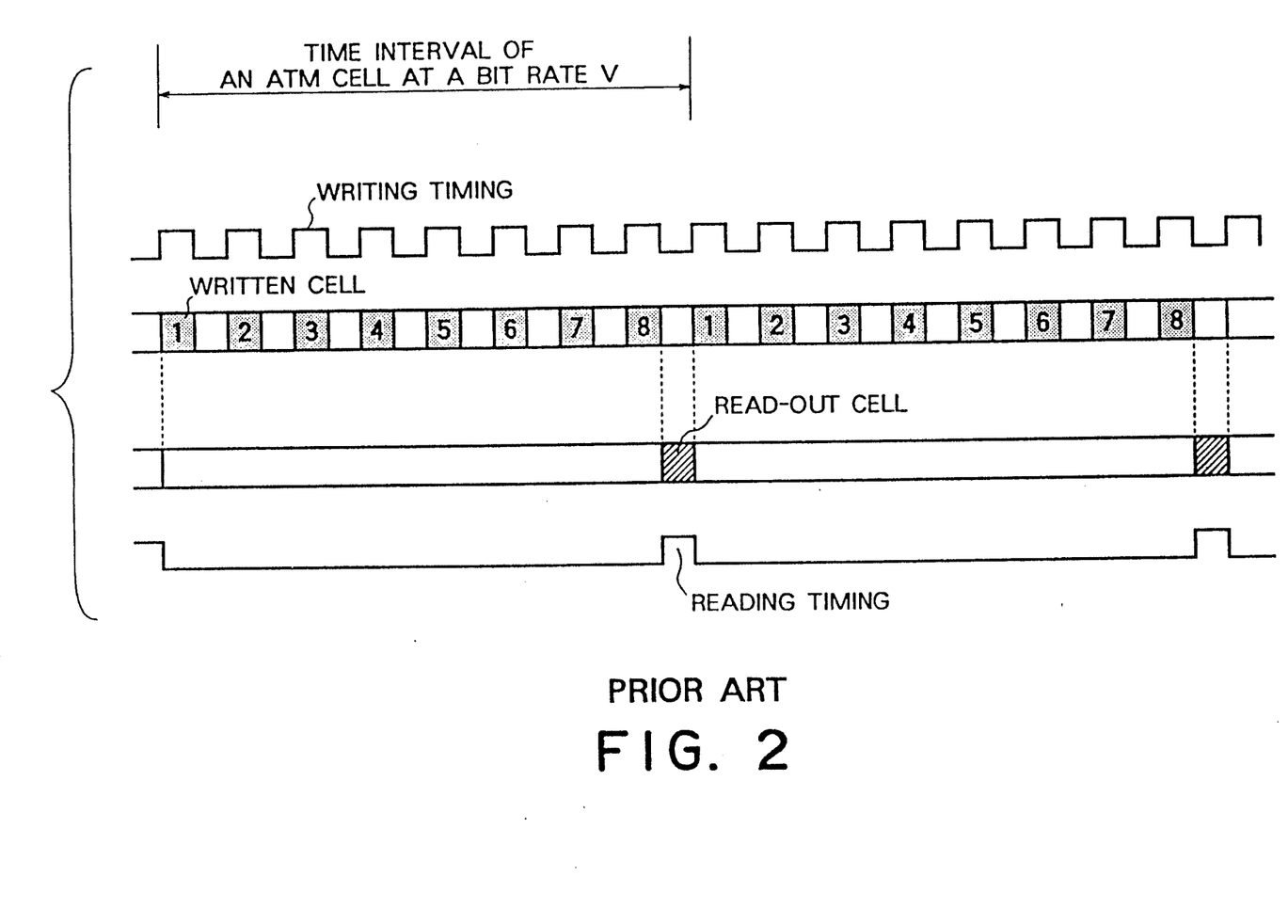
FIG. 2 is a time chart for use in describing operation of the ATM cell multiplexing device illustrated in FIG. 1.

In an example illustrated in FIG. 2, the integer N is equal to eight. That is, the number of the input lines 11 is eight. Inasmuch as writing operation is not carried out simultaneously with reading operation for the first-in first-out memory 15 using a single port RAM, each of the writing and the reading rates is inevitably made to become equal to twice the preselected bit rate $V \times N$ to carry out the reading and the writing operation in a time division fashion. A writing timing appears eight times for a time interval of one ATM cell of each of the input signals having the predetermined bit rate V. Supposing that the first through the N-th input signals represent the valid cells at a time, the first-in first-out memory 15 successively memorizes first through N-th (namely, eighth) valid cells as first through N-th (eighth) written cells during the time interval of one ATM cell of each of the input signals. A reading timing appears once for the time interval of one ATM cell of each of the input signals having the predetermined bit rate V. As a consequence, the first written cell is read out of the first-in first-out memory 15 in the first-in first-out order during the time interval of one ATM cell of each of the input signals as a first read-out cell. The second written cell is read out of the first-in first-out memory 15 during the time interval of a following ATM cell of each of the input signals as a second read-out cell. Likewise, the N-th (that is, the eighth) written cell is read out of the first-in first-out memory 15 as an eighth read-out cell. The first through the eighth read-out cells are collectively used as the read-out signal.

A parallel-serial (P/S) converter 17 is connected to the first-in first-out memory 15 and to the output line 120. The parallel-serial converter 17 converts the read-out signal into a time division multiplexed output signal of the predetermined bit rate V to deliver the time division multiplexed output signal to the output line 120.

Thus, a combination of the serial-parallel converters 12, the multiplexer 13, the time division bus 14, the first-in first-out memory 15, the controller 16, and the parallel-serial converter 17 serves as a processing section connected to the first through the N-th input lines 11 and to the output line 12. The processing section processes the first through the N-th input signals into the time division multiplexed output signal having the predetermined bit rate V. The processing section delivers the time division multiplexed output signal to the output line 120. Another combination of the serial-parallel converter 12, the multiplexer 13, and the time division bus 14 is operable as a time division multiplexing section for time division multiplexing the first through the N-th input signals into the time division multiplexed signal having the preselected bit rate V×N.

Figure 3:
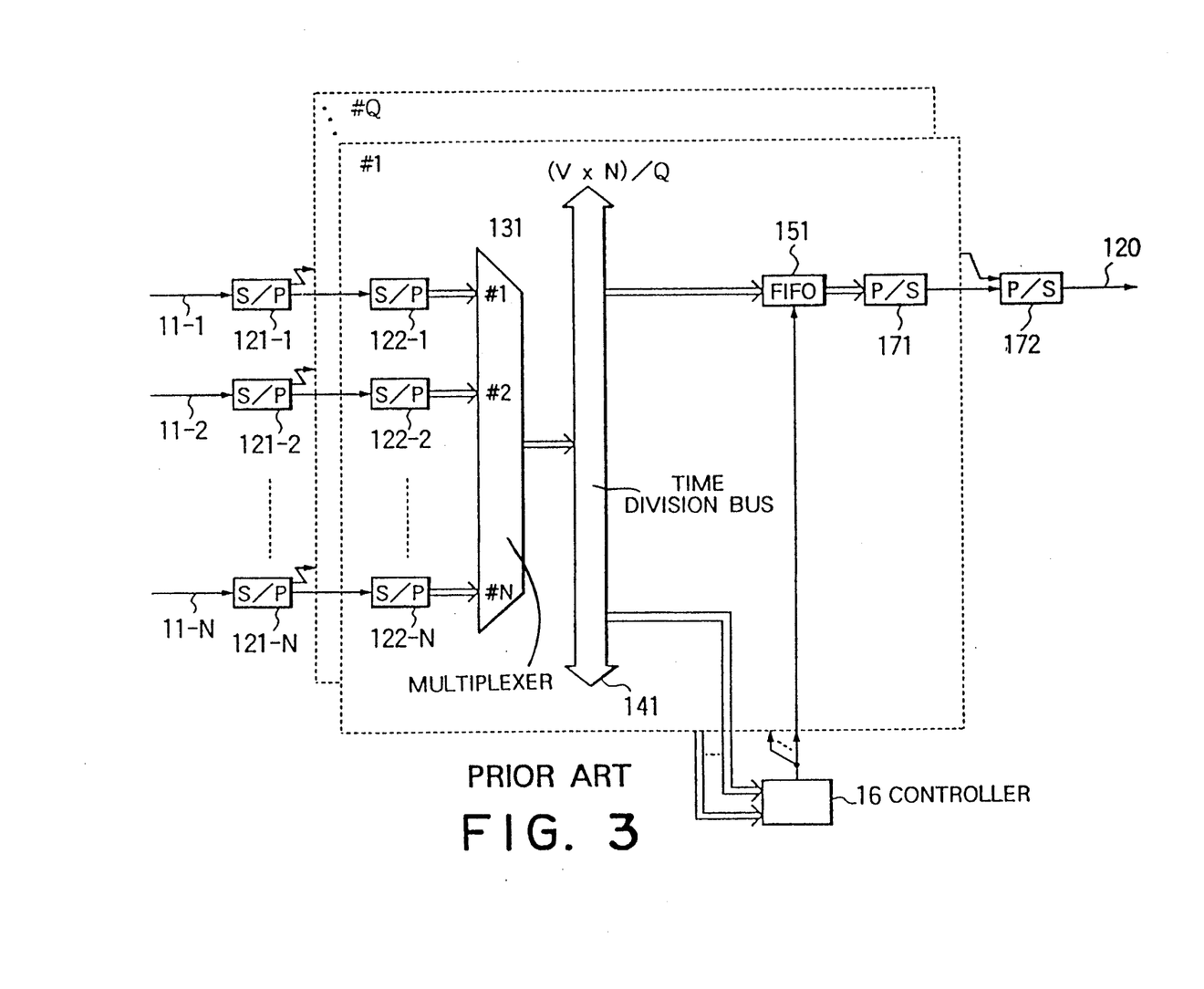
FIG. 3 is a block diagram of details of the ATM cell multiplexing device illustrated in FIG. 1.
Figure 4A:
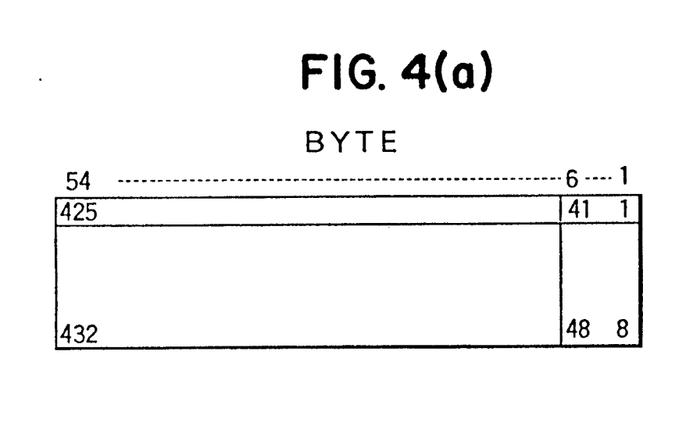
FIGS. 4(a)-4(c) are a diagram for use in describing operation of the ATM cell multiplexing device of FIG. 1 and of an ATM cell multiplexing device according to this invention.

Turning to FIG. 3, description will proceed to details of the ATM cell multiplexing device illustrated in FIG. 1. The first through the N-th input lines 11-1 to 11-N are supplied with the first through the N-th input signals, each of which represents successive ATM cells as described above. One of the ATM cells is illustrated in FIG. 4(a). In FIG. 4(a), the illustrated ATM cell comprises first through fifty-fourth bytes, each byte consisting of eight bits which are more in general Q bits. More specifically, the first byte comprises first through eighth bits. The second byte comprises ninth through sixteenth bits. The fifty-fourth byte comprises four hundred and twenty-fifth through four hundred and thirty-second bits.

In FIGS. 3 and 4(a), serial-parallel (S/P) converters 121-1, 121-2, . . . , and 121-N are connected to the first through the N-th input lines 11-1 to 11-N, respectively. Each of the serial-parallel converters 121-1 to 121-N converts the input signal into first through eighth (Q-th) sliced cells. The first sliced cell comprises the first, the ninth, . . . , and the four hundred and twenty-fifth bits. The eighth sliced cell comprises the eighth, sixteenth, . . . , and four hundred and thirty-second bits.

In FIG. 3, first through Q-th (eighth) LSI chips #1, . . . , and #Q (#8) are connected to the serial-parallel converters 121-1 to 121-N. The first LSI chip #1 is supplied with the first sliced cells from the serial-parallel converters 121-1 to 121-N. Likewise, the Q-th (the eighth) LSI chip #Q (#8) is supplied with the Q-th (the eighth) sliced cells. Inasmuch as the first through the Q-th (the eighth) LSI chips #1 to #Q (#8) are similar in structure and in operation to each other, description will now be made only as regards the first LSI chip #1.

Figure 4B:
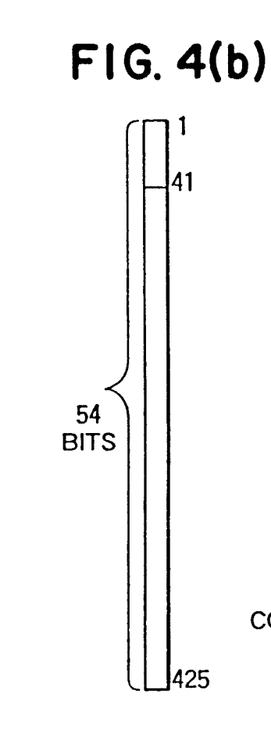

The first LSI chip #1 comprises serial-parallel (S/P) converters 122-1, 122-2, . . . , and 122-N connected to the serial-parallel converters 121-1 to 121-N, respectively. The serial-parallel converter 122-1 is supplied with the first sliced cell from the serial-parallel converter 121-1. Likewise, the serial-parallel converter 122-N is supplied with the first sliced cell from the serial-parallel converter 121-N. Each of the serial-parallel converters 122-1 to 122-N converts the first sliced cell under consideration into a parallel signal illustrated in FIG. 4(b). A combination of the serial-parallel converter 121-1, the serial-parallel converter 122-1 of the first LSI chip #1, and similar serial-parallel converters of remaining LSI chips serves as the first serial-parallel converter 12-1 illustrated in FIG. 1. Likewise, another combination of the serial-parallel converter 121-N, the serial-parallel converter 122-N of the first LSI chip #1, and similar serial-parallel converters of the remaining LSI chips serves as the N-th serial-parallel converter 12-N illustrated in FIG. 1.

Figure 4C:
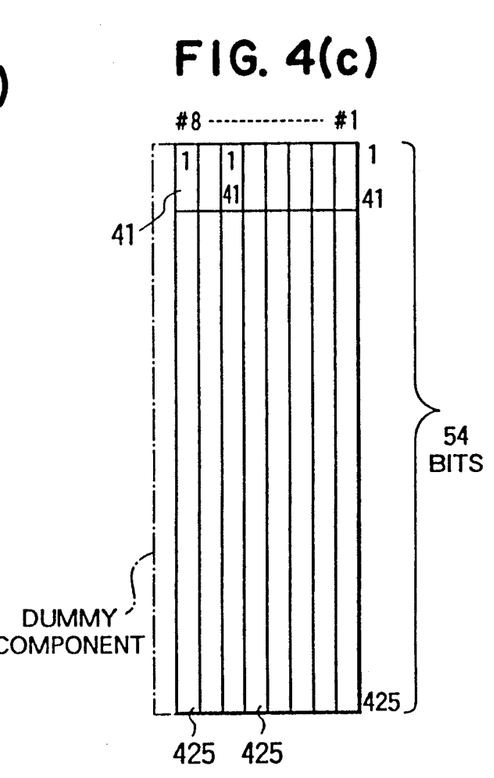

In FIG. 3, a multiplexer 131 is supplied with the parallel signals from the serial-parallel converters 122-1 to 122-N for time division multiplexing the parallel signals into a multiplexed signal. As shown in FIG. 4(c), the multiplexed signal has first through eighth components #1 to #8 (#N) derived from the first sliced cells of the first through the eighth (N-th) input signals, respectively.

Likewise, a similar multiplexer of the Q-th LSI chip #Q produces another multiplexed signal having first through eighth components #1 to #8 (#N) which are derived from the Q-th sliced cells of the first through the eighth (N-th) input signals, respectively. A combination of the multiplexer 131 of the first LSI chip #1 and the similar multiplexers of the remaining LSI chips acts as the multiplexer 13 illustrated in FIG. 1.

In FIG. 3, a first-in first-out (FIFO) memory 151 is connected to the multiplexer 131 through a time division bus 141 which serves in combination with similar time division bus of the remaining LSI chips as the time division bus 14 illustrated in FIG. 1. Supposing that the first through the N-th input signals represent the valid cells at a time, the controller 16 successively writes in the first-in first-out memory 151 the first through the eighth components #1 to #8 (#N) derived from the first sliced cells and reads from the first-in first-out memory 151 the first component #1 in the manner described in FIG. 2. It should be noted here that such writing and reading operation for the first LSI chip #1 is carried out in synchronism with reading and writing operation for remaining LSI chips. A combination of the first-in first-out memory 151 of the first LSI chip #1 and similar first-in first-out memories of the remaining LSI chips acts as the first-in first-out memory (FIG. 1).

A combination of a parallel-serial (P/S) converter 171 of the first LSI chip #1, similar parallel-serial converters of the remaining LSI chips, and a parallel-serial (P/S) converter 172 serves as the parallel-serial converter 17 illustrated in FIG. 1.

Figure 5:
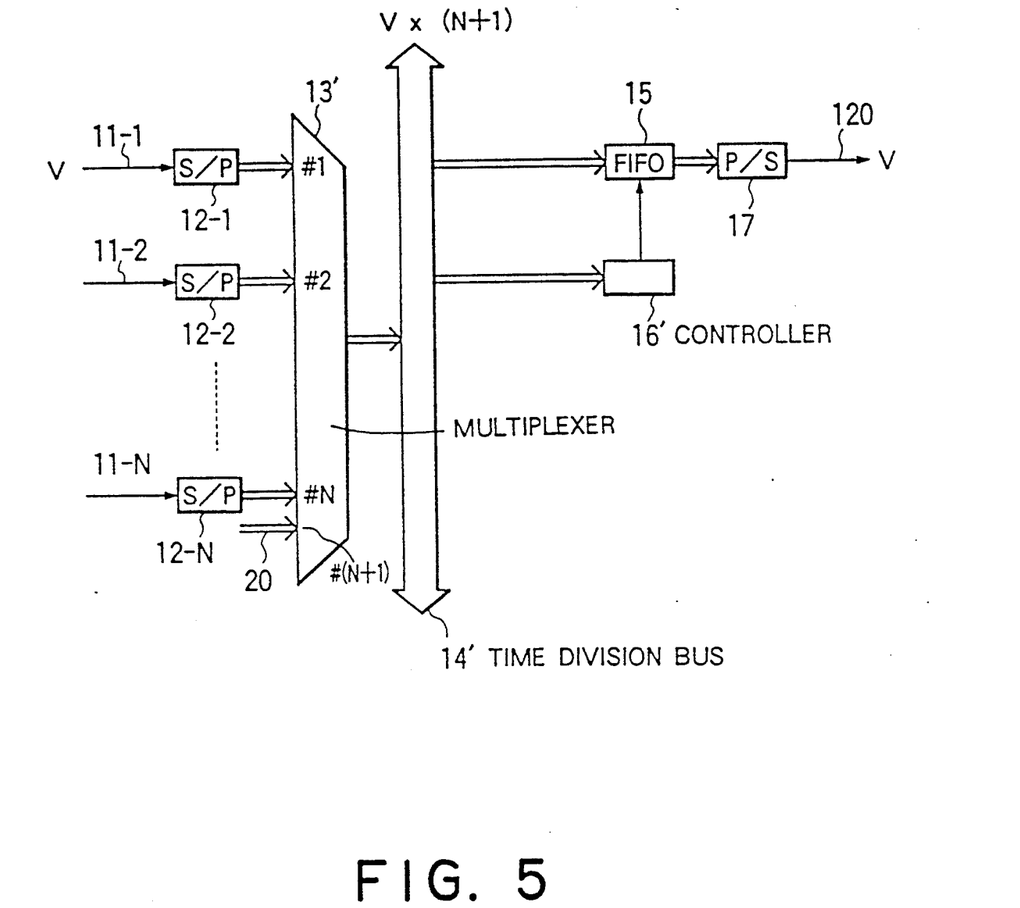
FIG. 5 is a block diagram of an ATM cell multiplexing device according to a first embodiment of this invention.

Turning to FIG. 5, description will proceed to an ATM cell multiplexing device according to a first embodiment of this invention. The ATM cell multiplexing device is similar to the ATM cell multiplexing device of FIG. 1 except for the following. The ATM cell multiplexing device comprises a dummy additional input line 20 supplied with a dummy or additional input signal having the predetermined bit rate V and representing successive additional cells, each of which is identical with the invalid or empty cells. Each invalid cell consists of bits having a logic "0" level in common. A multiplexer 13' is connected to the first through the N-th serial-parallel converters 12-1 to 12-N and the dummy or additional input line 20 for time division multiplexing the first through the N-th parallel signals and the dummy input signal into a time division multiplexed signal having a prescribed bit rate V×(N+1) and comprising first through N-th multiplexed cells or components and a dummy or additional multiplexed cell. The first through the N-th multiplexed cells and the dummy multiplexed cell are derived from the first through the N-th input signals and the dummy input signal, respectively. Supposing that the integer N is equal to eight, the prescribed bit rate $V \times (N+1)$ is equal to 5598.72 Mbits/s.

The first-in first-out memory 15 is connected to the multiplexer 13' through a time division bus 14' used for the prescribed bit rate $V \times (N+1)$. A controller 16' is connected to the time division bus 14' and to the first-in first-out memory 15 for controlling the first-in first-out memory 15 to successively write the valid cells of the first through the N-th multiplexed cells in the first-in first-out memory 15 as written cells at a writing rate or speed equal to the prescribed bit rate $V \times (N+1)$ for a writing time interval defined by the first through the N-th multiplexed cells and to read the written cells out of the first-in first-out memory 15 in a first-in first-out order as a read-out signal at a reading rate or speed equal to the prescribed bit rate $V \times (N+1)$ for a reading time interval defined by the dummy multiplexed cell as shown in FIG. 6.

Figure 6:
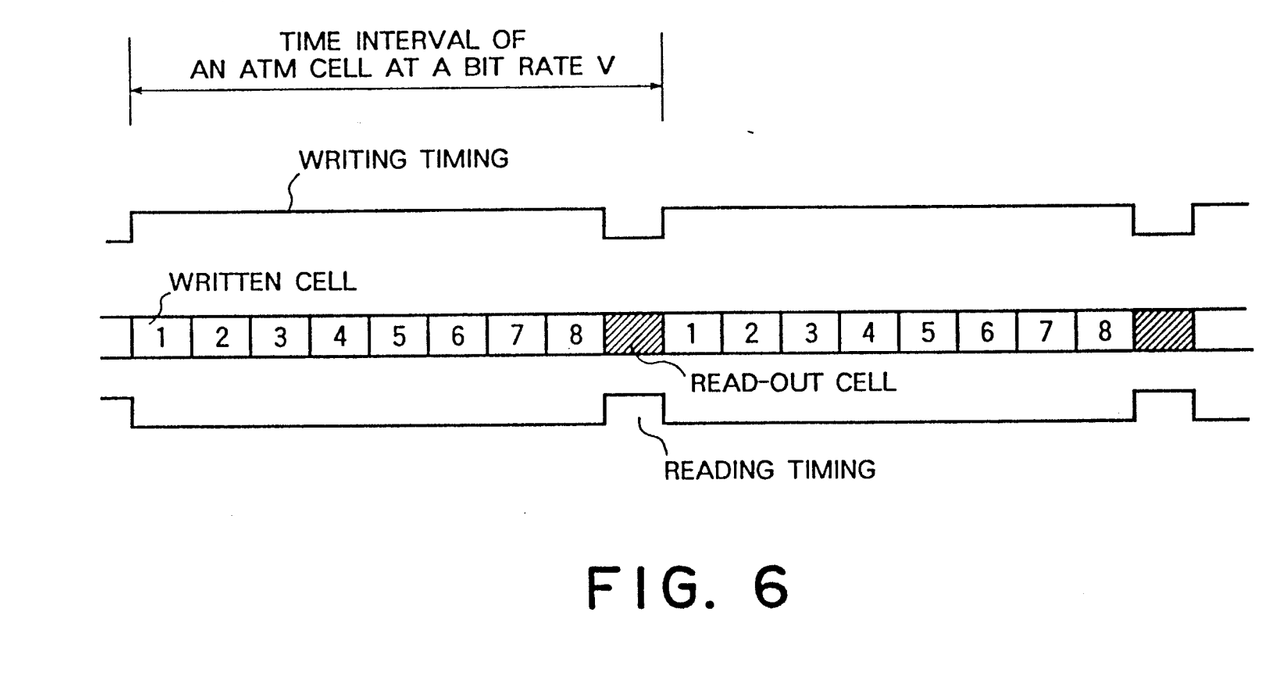
FIG. 6 is a time chart for use in describing operation of the ATM cell multiplexing device illustrated in FIG. 5.

In an example illustrated in FIG. 6, the integer N is equal to eight. The writing time interval is defined by the first through the eighth multiplexed cells as indicated by a writing timing in FIG. 6. The reading time interval is defined by the dummy multiplexed cell as indicated by a reading timing in FIG. 6. The writing timing appears N (eight) times for a time interval of one ATM cell of each of the input signals having the predetermined bit rate V. The reading timing appears once for the time interval of one cell of each of the input signals having the predetermined bit rate V. In this event, each of the writing and the reading rates or speeds is made to become equal to the prescribed bit rate $V \times (N+1)$. For the time interval of one cell of each of the input signals, the first-in first-out memory 15 memorizes at most eight (N) valid cells of the input signals as memorized cells and delivers one of the memorized cells to the parallel-serial converter 17 in the first-in first-out order. At any rate, an accessing speed (namely, the writing and the reading speeds) is reduced from $2 \times N \times V$ (FIG. 1) to $V \times (N+1)$ according to this invention. That is, a ratio of the accessing speed of the device of FIG. 5 to the accessing speed of the device of FIG. 1 is equal to $(N+1)/(2 \times N)$.

In FIG. 5, the parallel-serial converter 17 converts the read-out signal of the bit rate $V \times (N+1)$ into the time division multiplexed output signal of the predetermined bit rate V to deliver the time division multiplexed output signal to the output line 120.

Figure 7:
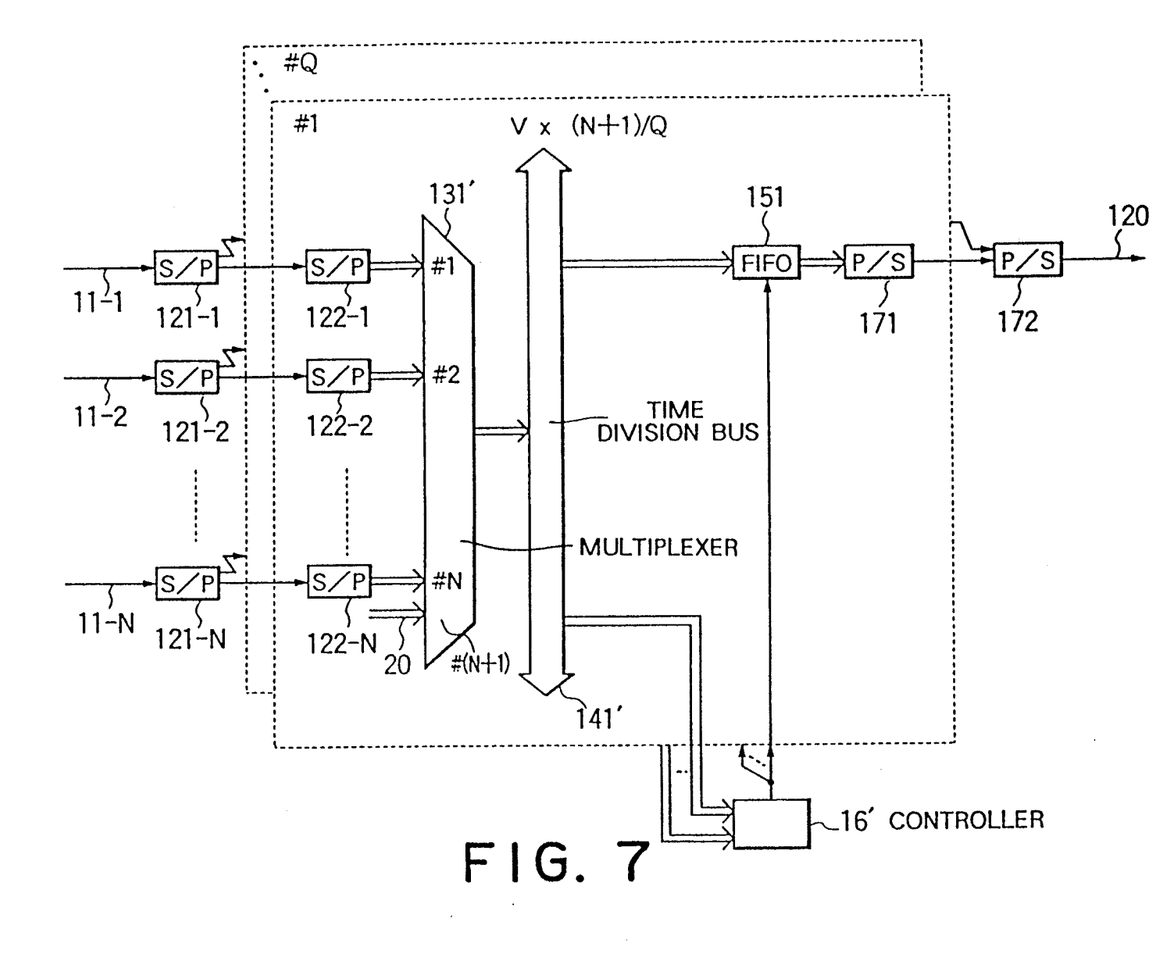
FIG. 7 is a block diagram of details of the ATM cell multiplexing device illustrated in FIG. 5.

Turning to FIG. 7, description will proceed to details of the ATM cell multiplexing device illustrated in FIG. 5. The ATM cell multiplexing device of FIG. 7 is similar to the ATM cell multiplexing device of FIG. 3 except for the following. Inasmuch as the first through the Q-th (eighth) LSI chips #1 to #Q (#8) are similar in structure and in operation to each other, description will now be made only as regards the first LSI chip #1. The first LSI chip #1 comprises a multiplexer 131' and a time division bus 141' instead of the multiplexer 131 and the time division bus 141 of FIG. 3. The multiplexer 131' is supplied with the parallel signals from the serial-parallel converters 122-1 to 122-N and with the dummy input signal from the dummy input line 20 for time division multiplexing the parallel signals and the dummy input signal into a multiplexed signal. As shown in FIG. 4(c), the multiplexed signal has the first through the eighth components #1 to #8 (#N) and a dummy component which is illustrated as an area partly enclosed with a dash-dot line. The dummy component is derived from the dummy input signal to have fifty four bits.

In FIG. 7, the multiplexer 131' serves in combination with similar multiplexers of remaining LSI chips as the multiplexer 13' illustrated in FIG. 5. The first-in first-out memory 151 is connected to the multiplexer 131' through a time division bus 141' which serves in combination with similar time division bus of the remaining LSI chips as the time division bus 14' illustrated in FIG. 5. Supposing that the first through the N-th input signals represent the valid cells at a time, the controller 16' successively writes the first through the eighth components #1 to #8 (#N) in the first-in first-out memory 151 and reads the first component #1 from the first-in first-out memory 151 in the manner described in FIG. 6. Such writing and reading operation for the first LSI chip #1 is carried out in synchronism with reading and writing operation for the remaining LSI chips. A combination of the parallel-serial converter 171 of the first LSI chip #1, similar parallel-serial converters of the remaining LSI chips, and the parallel-serial converter 172 acts as the parallel-serial converter 17 illustrated in FIG. 5.

Figure 8:
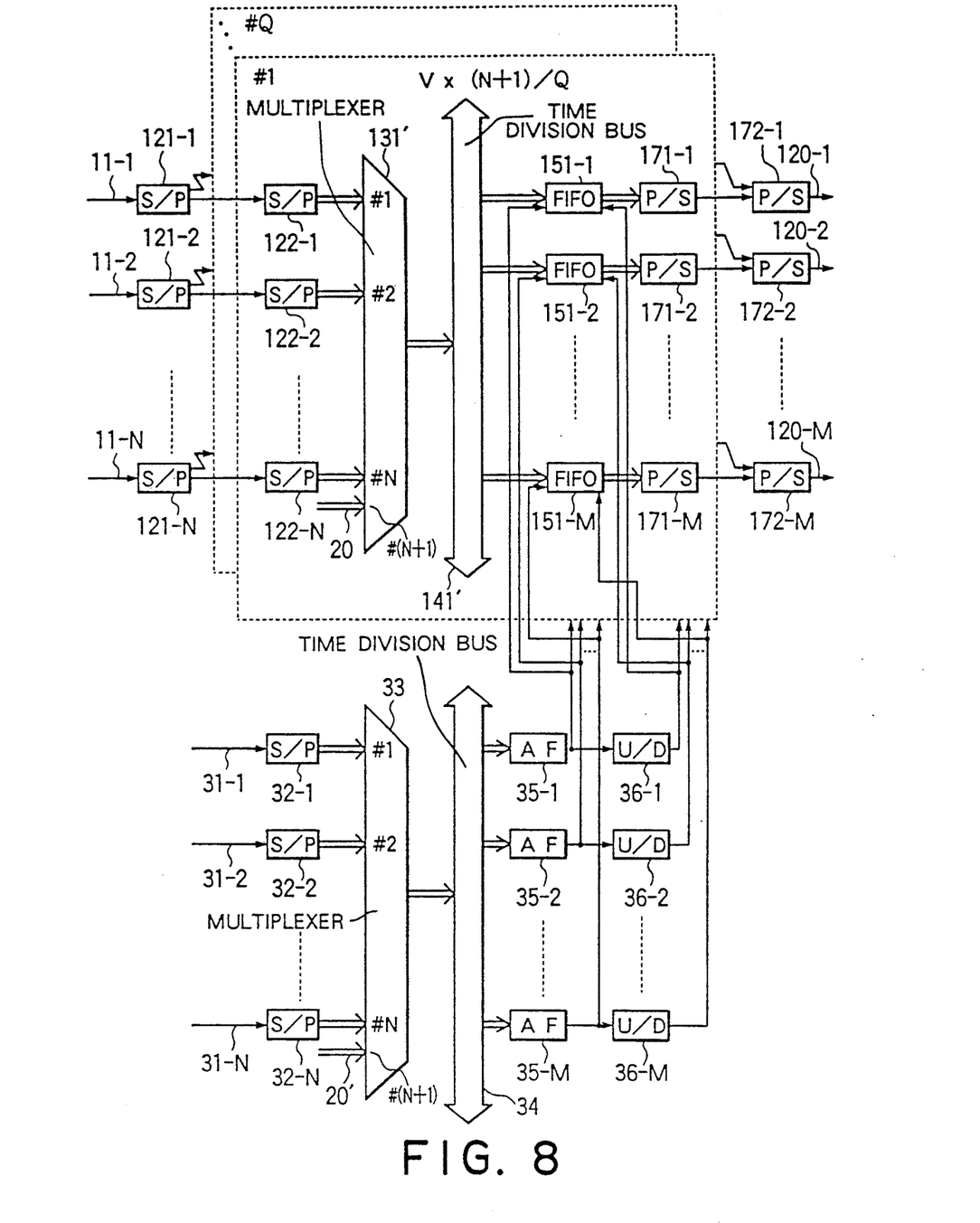
FIG. 8 is a block diagram of an ATM cell multiplexing device according to a second embodiment of this invention.

Turning to FIG. 8, description will proceed to an ATM cell multiplexing device according to a second embodiment of this invention. The ATM cell multiplexing device is operable as an ATM cell switching device in the manner which will become clear as the description proceeds. The ATM cell multiplexing device is similar to the ATM cell multiplexing device of FIG. 7 except for the following. The ATM cell multiplexing device comprises first through M-th output lines 120-1, 120-2, ..., and 120-M having first through M-th output line addresses or numbers, respectively, where M represents a natural number greater than one. The ATM cell multiplexing device further comprises first through N-th address lines 31-1, 31-2, ..., and 31-N supplied with first through N-th address signals, each having the predetermined bit rate V to successively represent the output line addresses. In this event, the first address signal successively represents the output line addresses of the output lines 120 (suffixes omitted) to which the successive ATM cells represented by the first input signal should be sent. Likewise, the N-th address signal successively represents the output line addresses of the output lines 120 to which the successive ATM cells represented by the N-th input signal should be sent.

First through N-th serial-parallel (S/P) converters 32-1, 32-2, ..., and 32-N are connected to the first through the N-th address lines 31 (suffixes omitted) for converting the first through the N-th address signals into first through N-th parallel address signals, respectively. A dummy address line 20' is supplied with a dummy address signal having the predetermined bit rate V. The dummy address signal successively represents addresses, each consisting of bits having a logic "0" level in common. A multiplexer 33 is connected to the first through the N-th serial-parallel converters 32 (suffixes omitted) and to the dummy address line 20' for time division multiplexing the first through the N-th parallel address signals and the dummy address signal into a time division multiplexed signal having the preselected bit rate $V \times (N+1)$ and comprising first through N-th multiplexed addresses and a dummy multiplexed address. The first through the N-th multiplexed addresses and the dummy multiplexed address are derived from the first through the N-th address signals and the dummy address signal, respectively.

First through M-th address filters (AF) 35-1, 35-2, . . . , and 35-M are connected to the multiplexer 33 through a time division bus 34 used for the prescribed bit rate $V \times (N+1)$. The first through the M-th address filters 35 (suffixes omitted) preliminarily memorize, as first through M-th memorized addresses, the first through the M-th output line addresses of the first through the M-th output lines 120-1 to 120-M, respectively. Each of the first through the M-th address filters 35 produces a coincidence pulse whenever each of the output line addresses represented by the first through the N-th multiplexed addresses coincides with the memorized address of each of the first through the M-th address filters 35. First through M-th up/down (U/D) counters 36-1, 36-2, . . . , and 36-M are connected to the first through the M-th address filters 35-1 to 35-M, respectively. Each of the up/down counters 36-1 to 36-M counts up an initial count equal to zero to an increased count whenever the coincidence pulse is received. When the increased count is greater than zero, each of the up/down counters 36-1 to 36-M produces a reading timing signal and counts down the increased count to a reduced count whenever the reading timing signal is produced.

Attention will be directed to the first through the Q-th (eighth) LSI chips #1 to #Q (#8). Inasmuch as the first through the Q-th (eighth) LSI chips #1 to #Q (#8) are similar in structure and in operation to each other, description will mainly be made as regards the first LSI chip #1. The first LSI chip #1 comprises first through M-th first-in first-out (FIFO) memories 151-1, 151-2, . . . , and 151-M connected to the time division bus 141' in common and to the first through the M-th address filters 35-1 to 35-M, respectively. Each of the first-in first-out memories 151 (suffixes omitted) memorizes an output signal of the multiplexer 131' as memorized signal when the coincidence pulse is received as a writing timing signal. Each of the first-in first-out memories 151 produces the memorized signal in the first-in first-out order when the reading timing signal is received.

It will be supposed that the first through the N-th input signals should be sent to the first output line 120-1. In this case, a combination of the first address filter 35-1 and the first up/down counter 36-1 is operable as the controller 16'illustrated in FIGS. 5 and 7.

First through M-th parallel-serial converters 171-1, 171-2, . . . , and 171-M are connected to the first through the M-th first-in first-out memories 151-1 to 151-M, respectively. First through M-th parallel-serial converters 172-1, 172-2, . . . , and 172-M are connected to the first through the M-th parallel-serial converters 171-1 to 171-M, respectively. The first through the M-th lines 120-1 to 120-M are connected to the first through the M-th parallel-serial converters 172-1 to 172-M, respectively. A combination of the first parallel-serial converters 171-1 and 172-1 acts as a combination of the parallel-serial converters 171 and 172 illustrated in FIG. 7. Another combination of the M-th parallel-serial converters 171-M and 172-M is operable as the combination of the parallel-serial converters 171 and 172 illustrated in FIG. 7.

While this invention has thus far been described in conjunction with a few preferred embodiments thereof, it will now be readily possible for one skilled in the art to put this invention into effect in various other manners. In FIG. 8, the address filters 35-1 to 35-M may be connected to the time division bus 141' with the address filters 35-1 to 35-M disconnected to the time division bus 34. In this case, each of the input lines 11-1 to 11-N should be supplied with an input signal comprising valid cells, each of which is accompanied or followed by a destination address representative of one of the line addresses of the output lines 120-1 to 120-M.

What is claimed is:

1. An ATM cell multiplexing device comprising:

first through N-th input lines supplied with first through N-th input signals, each having a predetermined bit rate V and representing successive ATM cells classifiable into valid cells and invalid cells, where N represents an integer greater than one;

an output line; and processing means connected to said first through said N-th input lines and to said output line for processing said first through said N-th input signals into a time division multiplexed output signal having said predetermined bit rate V, said processing means being for delivering said time division multiplexed output signal to said output line; wherein said processing means includes an additional input line supplied with an additional input signal having said predetermined bit rate V and representing successive additional cells, each of which is identical with said invalid cells;

time division multiplexing means connected to said first through said N-th input lines and said additional input line for time division multiplexing said first through said N-th input signals and said additional input signal into a time division multiplexed signal having a prescribed bit rate $V \times (N+1)$ and comprising first through N-th multiplexed cells and an additional multiplexed cell, said first through said N-th multiplexed cells and said additional multiplexed cell being derived from said first through said N-th input signals and said dummy input signal, respectively;

a first-in first-out memory connected to said time division multiplexing means;

controlling means connected to said time division multiplexing means and to said first-in first-out memory for controlling said first-in first-out memory to successively write said valid cells of said first through said N-th multiplexed cells in said first-in first-out memory as written cells at a writing rate equal to said prescribed bit rate $V \times (N+1)$ for a writing time interval defined by said first through said N-th multiplexed cells and to read said written cells out of said first-in first-out memory in a first-in first-out order as a read-out signal at a reading rate equal to said prescribed bit rate $V \times (N+1)$ for a reading time interval defined by said additional multiplexed cell; and converting means connected to said first-in first-out memory and to said output line for converting said read-out signal into said time division multiplexed output signal to deliver said time division multiplexed output signal to said output line.

2. An ATM cell multiplexing device comprising:

first through M-th output lines having output line numbers different from each other, where M represents a natural number greater than one;

first through N-th input lines supplied with first through N-th input signals, each having a predetermined bit rate V and representing successive ATM cells classifiable into valid cells and invalid cells, each of said valid cells having a destination address representative of one of said output line numbers, where N represents an integer greater than one;

an additional input line supplied with an additional input signal having said predetermined bit rate V and representing successive additional cells, each of which is identical with said invalid cells;

time division multiplexing means connected to said first through said N-th input lines and said additional input line for time division multiplexing said first through said N-th input signals and said additional input signal into a time division multiplexed signal having a prescribed bit rate $V \times (N+1)$ and comprising first through N-th multiplexed cells and an additional multiplexed cell, said first through said N-th multiplexed cells and said additional multiplexed cell being derived from said first through said N-th input signals and said additional input signal, respectively;

first through M-th first-in first-out memories corresponding to said first through said M-th output lines and connected to said time division multiplexing means;

controlling means connected to said time division multiplexing means and to said first through said M-th first-in first-out memories for controlling said first through said M-th first-in first-out memories to successively write said valid cells of said first through said N-th multiplexed cells in corresponding ones of said first through said M-th first-in first-out memories as written cells at a writing rate equal to said prescribed bit rate $V \times (N+1)$ for a writing time interval defined by said first through said N-th multiplexed cells and to read said written cells out of said first through said M-th first-in first-out memories in a first-in first-out order as first through M-th read-out signals at a reading rate equal to said prescribed bit rate $V \times (N+1)$ for a reading time interval defined by said additional multiplexed cell, each of said corresponding ones of said first through said M-th first-in first-out memories corresponding to one of said first through said M-th output lines that has an output line number represented by a designation address of each of said valid cells of said first through said N-th multiplexed cells; and first through M-th converting means connected to said first through said M-th first-in first-out memories and to said first through said M-th output lines for converting said first through said M-th read-out signals into first through M-th time division multiplexed output signals to deliver said first through M-th time division multiplexed output signals to said first through said M-th output lines, respectively.

* * * * *